US009067196B2

(12) United States Patent
Ravichandran et al.

(10) Patent No.: US 9,067,196 B2
(45) Date of Patent: Jun. 30, 2015

(54) FCC CATALYST ADDITIVE AND A METHOD FOR ITS PREPARATION

(75) Inventors: Gopal Ravichandran, Coimbatore (IN); Praveen Kumar Chinthala, Andhra Pradesh (IN); Tejas Doshi, Gujarat (IN); Arun Kumar, Tamil Nadu (IN); Amit Gohel, Gujarat (IN); Sukumar Mandal, Haryana (IN); Asit Kumar Das, Gujarat (IN); Srikanta Dinda, West Bengal (IN); Amit Kumar Parekh, Gujarat (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 616 days.

(21) Appl. No.: 13/231,416

(22) Filed: Sep. 13, 2011

(65) Prior Publication Data
US 2013/0023710 A1 Jan. 24, 2013

(30) Foreign Application Priority Data

Jul. 21, 2011 (IN) .......................... 2078/MUM/2011

(51) Int. Cl.
| | | |
|---|---|---|
| B01J 29/06 | (2006.01) | |
| C07C 4/06 | (2006.01) | |
| C10G 11/05 | (2006.01) | |
| B01J 29/40 | (2006.01) | |
| B01J 35/00 | (2006.01) | |
| B01J 29/18 | (2006.01) | |
| B01J 29/70 | (2006.01) | |
| B01J 29/80 | (2006.01) | |
| B01J 37/00 | (2006.01) | |
| C10G 11/18 | (2006.01) | |
| B01J 37/10 | (2006.01) | |
| B01J 29/08 | (2006.01) | |
| B01J 35/10 | (2006.01) | |

(52) U.S. Cl.
CPC . *B01J 29/40* (2013.01); *B01J 37/10* (2013.01); *B01J 35/0006* (2013.01); *B01J 29/06* (2013.01); *B01J 29/08* (2013.01); *B01J 29/084* (2013.01); *B01J 29/18* (2013.01); *B01J 29/7007* (2013.01); *B01J 29/80* (2013.01); *B01J 35/002* (2013.01); *B01J 35/1014* (2013.01); *B01J 35/1019* (2013.01); *B01J 37/0045* (2013.01); *C10G 11/05* (2013.01); *C10G 11/18* (2013.01); *B01J 2229/186* (2013.01); *B01J 2229/36* (2013.01); *B01J 2229/42* (2013.01)

(58) Field of Classification Search
USPC .......... 502/60, 63, 64, 67, 68, 69, 77, 78, 79; 585/639, 653; 208/114, 118, 119, 122
See application file for complete search history.

(56) References Cited

U.S. PATENT DOCUMENTS

| | | |
|---|---|---|
| 3,758,403 A | 9/1973 | Rosinski et al. |
| 3,894,931 A | 7/1975 | Nace et al. |
| 3,894,933 A | 7/1975 | Owen et al. |
| 3,894,934 A | 7/1975 | Owen et al. |
| 4,309,279 A | 1/1982 | Chester et al. |
| 4,309,280 A | 1/1982 | Rosinski et al. |
| 4,552,648 A | 11/1985 | Rosinski et al. |
| 5,110,776 A | 5/1992 | Chitnis et al. |
| 5,126,298 A | 6/1992 | Absil et al. |
| 5,190,902 A | 3/1993 | Demmel |
| 5,231,064 A | 7/1993 | Absil et al. |
| 5,318,696 A | 6/1994 | Kowalski |
| 5,348,643 A | 9/1994 | Absil et al. |
| 5,366,948 A | 11/1994 | Absil et al. |
| 5,456,821 A * | 10/1995 | Absil et al. ..................... 208/114 |
| 5,472,594 A | 12/1995 | Tsang et al. |
| 5,472,922 A | 12/1995 | Degnan et al. |
| 5,521,133 A | 5/1996 | Koermer et al. |
| 5,958,818 A | 9/1999 | Demmel et al. |
| 5,968,342 A | 10/1999 | Tsunoda et al. |
| 6,080,303 A | 6/2000 | Cao et al. |
| 6,566,293 B1 | 5/2003 | Vogt et al. |
| 6,835,863 B2 | 12/2004 | Chester et al. |
| 6,858,556 B2 | 2/2005 | Kuvettu et al. |
| 6,916,757 B2 | 7/2005 | Ziebarth et al. |
| 7,375,048 B2 | 5/2008 | Smith et al. |
| 7,488,700 B2 | 2/2009 | Choi et al. |
| 7,517,827 B2 * | 4/2009 | Ravichandran et al. ........ 502/63 |
| 7,547,813 B2 | 6/2009 | Smith et al. |
| 7,585,804 B2 | 9/2009 | Smith et al. |
| 7,601,663 B2 | 10/2009 | Choi et al. |
| 7,727,924 B2 | 6/2010 | Liu et al. |
| 2001/0053868 A1 * | 12/2001 | Chester et al. ................ 585/648 |
| 2002/0049133 A1 | 4/2002 | Ziebarth et al. |
| 2003/0047487 A1 | 3/2003 | Ziebarth et al. |

(Continued)

FOREIGN PATENT DOCUMENTS

| | | |
|---|---|---|
| CN | 1302228 A | 7/2001 |
| CN | 1370216 A | 9/2002 |

(Continued)

OTHER PUBLICATIONS

H.S. Cerqueira et al., "Deactivation of FCC catalysts", Journal of Molecular Catalysis A: Chemical, Jul. 1, 2008.

(Continued)

*Primary Examiner* — Elizabeth Wood
(74) *Attorney, Agent, or Firm* — Harness, Dickey & Pierce, P.L.C.

(57) ABSTRACT

The present invention relates to a Fluid Catalytic Cracking (FCC) additive preparation process and composition, which has high efficiency in the production of light olefins C2, C3 and C4 hydrocarbons, specifically propylene. The present invention discloses the stabilization of medium pore zeolite specifically ZSM-5 using optimum phosphate salts at a pH in the range 7-9 with synergetic combination of silica rich binder to produce FCC additive having excellent stability under severe hydrothermal conditions.

15 Claims, 4 Drawing Sheets

(56) References Cited

U.S. PATENT DOCUMENTS

| | | | | |
|---|---|---|---|---|
| 2006/0011513 | A1* | 1/2006 | Kumar | 208/114 |
| 2006/0021912 | A1 | 2/2006 | Chen et al. | |
| 2007/0123417 | A1* | 5/2007 | Stockwell | 502/331 |
| 2007/0173399 | A1 | 7/2007 | Lau et al. | |
| 2010/0010279 | A1* | 1/2010 | Kumar | 585/653 |
| 2010/0261944 | A1* | 10/2010 | Nesterenko et al. | 585/641 |
| 2011/0108462 | A1* | 5/2011 | Chang | 208/113 |

FOREIGN PATENT DOCUMENTS

| | | |
|---|---|---|
| IN | 319/BOM/1992 | 1/1993 |
| JP | H08127546 A | 5/1996 |
| JP | 2010247146 A | 11/2010 |
| JP | 2011079909 A | 4/2011 |
| WO | WO/98/41595 A1 | 9/1998 |

OTHER PUBLICATIONS

T.F. Degnan et al., "History of ZSM-5 fluid catalytic cracking additive development at Mobil," Microporuous and Mesoporous Materials, Aug. 26, 2009.

Guoliang Zhao et al., "Effect of phosphorus on HZSM-5 catalyst for $C_4$-olefin cracking reactions to produce propylene," Journal of Catalysis, Apr. 5, 2007.

T. Blasco et al., "Hydrothermal Stabilization of ZSM-5 Catalytic Cracking additives by Phosphorus addition" Journal of Catalysis, Jan. 25, 2006.

First Chinese Office Action regarding Application No. 201180072389.5, dated Feb. 28, 2015. Translation obtained from espacenet.com.

Japanese Office Action regarding Application No. 2014-520792, dated Feb. 19, 2015. Translation obtained from espacenet.com.

* cited by examiner

FCC CATALYST ADDITIVE AND A METHOD FOR ITS PREPARATION

CROSS-REFERENCE TO RELATED APPLICATIONS

This application claims the benefit and priority of Indian Application No. 2078/MUM/2011, filed Jul. 21, 2011. The entire disclosure of the above application is incorporated herein by reference.

FIELD OF THE INVENTION

This invention relates to a Fluid Catalytic Cracking (FCC) additive. More particularly, the present invention relates to a zeolite based FCC additive and a method for preparing the same.

BACKGROUND AND DESCRIPTION OF THE PRIOR ART

Worldwide demand for propylene is growing continuously and in recent years propylene prices have exceeded that of ethylene. Almost 60% of the total propylene is produced by steam cracking of various hydrocarbon streams like Naphtha, Gas oil and Liquid Petroleum Gas (LPG). One of the cheapest way to obtain propylene is from Fluid Catalytic Cracking (FCC), which contributes to >30% of the total propylene production.

Zeolite is one of the most widely used catalytic materials in hydrocarbon conversions. It is being widely used as catalyst and/or additive in catalytic crackers or incorporated in cracking catalysts. The use of cracking catalyst comprised of a large pore size crystalline zeolite (pore size greater than 7 angstrom units) in admixture with ZSM-5 type zeolite for improving the octane number has been reported in U.S. Pat. No. 3,758,403. When a conventional catalyst containing 10 percent REY is added with ZSM-5 molecular sieve in the range of 1.5 percent to 10 percent, the gasoline octane number and the yield of lower olefins are increased. However, it has been found that the increasing amplitude is reduced with increasing amount of ZSM-5 molecular sieve. Using an additive that contains ZSM-5 molecular sieve has the same effect.

Similar combinations of ZSM 5 with a zeolite cracking catalyst of the X or Y faujasite variety have been described in U.S. Pat. Nos. 3,894,931; 3,894,933; and 3,894,934.

Researchers have attempted to take advantage of the cracking activity/selectivity of ZSM-5 in different proportions. These have been reported in numerous patents such as U.S. Pat. Nos. 4,309,279 and 4,309,280.

Use of pre-treated zeolite, particularly ZSM-5 in the additive catalyst in combination with FCC catalyst has been widely reported. For example, use of thermally treated zeolite for its use in FCC has been reported in U.S. Pat. No. 4,552,648.

Apart from its activity and selectivity one of the most desirable attributes of the FCC catalyst and additive is its hydrothermal stability. The regeneration conditions in a FCC unit are quite severe (typically 690-800° C. in the presence of steam) and the additive and the catalyst, specifically zeolites are very much susceptible.

Under these conditions de-alumination of the zeolite takes place, resulting in a loss of Al—OH—Si groups responsible by the Brönsted acidity. Preventing or minimizing de-alumination is a topic of continuous interest in the field of FCC applications. Exchange of rare earth (RE) retards destruction of the Y zeolite during the hydrothermal treatment which also results in an increase in the strength of acid sites enhanced cracking activity. However, increase in RE, promotes hydrogen transfer activity and thereby reduces the propylene yield. Hence, in order to maintain the activity and also to minimize hydrogen transfer, optimum amount of RE is exchanged and higher amount of U.S.Y zeolite is used.

One of the known approaches for improving the hydrothermal stability of the ZSM-5 additives is treatment with Phosphates. In the case of ZSM-5 zeolite, phosphorus compounds interact with bridged OH groups, thereby decreasing the zeolite acidity and affecting the catalytic activity. Blasco et al. (J. Catal. 237 (2006) 267-277) describes different proposed models by several researchers for surface structure of phosphate in ZSM-5 zeolite. The acidity reduction by framework dealumination and formation of aluminum phosphate has been reported. Thermal treatment of $H_3PO_4$ impregnated HZSM-5 causes less dealumination than that of the same treatment of un-impregnated HZSM-5 indicating that phosphorous partially protects Al from being removed from the framework. This is well known in the prior art. Considerable work has been done by formulating and optimizing catalyst/additive compositions.

Generally the FCC catalysts/additives are deactivated at above 750° C. in the laboratory/pilot plant to simulate commercial FCC plant yields. Close predictions have been observed only for FCC catalyst and on the contrary, ZSM-5 containing additives are less active in commercial plants than the laboratory predictions for LPG and propylene yield.

FCC Cracking catalyst containing phosphate treated zeolites is disclosed in U.S. Pat. No. 5,110,776. According to the process USY/REY zeolite is contacted with a phosphate salt prior to clay-sodium silicate-sulfuric acid addition. In the catalyst disclosed in U.S. Pat. No. 5,110,776, sodium silicate is the major binder. It has been reported that phosphate treatment of the aluminum oxide containing matrix material leads to the formation aluminum phosphate which acts as a glue in the matrix and this leads to the improvement in the attrition resistance.

Various FCC processes that employ phosphorous treated zeolite, especially ZSM either as FCC catalyst or as an additive has been reported in U.S. Pat. Nos. 5,231,064, 5,348,643, 5,472,594, 6,080,303, U.S. Pat. 2003/0047487, U.S. Pat. Nos. 5,472,594, 5,456,821, 6,566,293 and WO 98/41595.

Numerous studies on the performance of ZSM-5 additive have been reviewed by Degnan et al. (Microporous and Mesoporous Materials 35-36 (2000) 245). Demmel et al. (U.S. Pat. No. 5,190,902) teaches the preparation methods for attrition resistant binders wherein a slurry of clay particles is brought to either a low pH level (1 to 3) or to a high pH level (10 to 14) and is mixed with a phosphorous containing compound in a concentration of 2 to 20 wt %.

Also U.S. Pat. No. 5,231,064 discloses the preparation and use of ZSM containing catalytic cracking catalysts containing phosphorous treated clay prepared at pH less than 3. Further, U.S. Pat. No. 5,126,298 also discloses the preparation of additive having attrition resistance in the range of 5-20. According to the claims, pH of final catalyst slurry prior to spray drying is less than 3.

U.S. Pat. No. 6,858,556 teaches the preparation of stabilized dual zeolite in a single particle catalyst composition consisting of 5% ZSM-5 and 12% REY using conventional silica-alumina binder for cracking of heavier hydrocarbons into lighter products.

U.S. Pat. Nos. 7,585,804, 7,547,813, 7,375,048, and 5,521,133 disclose attrition resistant FCC additive containing at least 30% ZSM-5. The phosphoric acid is injected into the mixture of highly dispersed kaolin slurry, ZSM zeolite, reactive and non-reactive alumina to make attrition resistant additives by employing on-line mixing of phosphoric acid with zeolite-alumina-clay slurry to minimize contact time and avoid viscosity.

Ziebarth et al. (U.S. Pat. No. 6,916,757) discloses the preparation of FCC additive at pH below 3, containing ZSM-5 zeolite, phosphate and alumina. The alumina content has been optimized to have Attrition Index (AI) of about 20 or less for an additive containing zeolite content of 30-60 wt %. The additives are deactivated at 815° C. (1500 F) for 4 hours prior to Micro Activity Test (MAT).

A hydrothermally stable porous molecular sieve catalyst and a preparation method thereof is disclosed in Choi et al. (U.S. Pat. No. 7,488,700). The method disclosed by Choi et al comprises the steps of adding molecular sieve to aqueous slurry phosphate and water soluble metal salt and finally removing the water by evaporation process. Its been reported that the catalyst maintains its physical and chemical stabilities even after hydrothermal deactivation in an atmosphere of 100% steam at 750° C. for 24 hours. The catalytic properties are evaluated in a fixed bed naphtha cracking and catalysts are found to be active and more selective to olefins ($C_2$ and $C_3$).

U.S. Pat. No. 7,601,663 discloses the preparation of solid acid catalyst and producing light olefins from hydrocarbon stocks mainly for naphtha cracking. The method disclosed involves the use of pillaring binding agent, which is prepared by reaction of aluminum salt with phosphorous compounds.

A Process for catalysts component or additives, more resistant to the hydrothermal deactivation, employed in fluid catalytic cracking processes is disclosed in Lau et al. (U.S. Pat. No. 2007/0173399). The process involves the use of a low $Na_2O$ content zeolite which is treated with phosphorous in the presence of water vapour. The phosphorous content deposited as $P_2O_5$ ranges between 1% and 10% w/w in relation to the weight of the zeolite. The hydrothermal deactivation studies are carried out at 800° C. for 5 hours.

Most of the commercial FCC units, use more than 9-10% ZSM-5 crystals to maximize propylene yields. Also refiners look for hydrothermally stable ZSM-5 additive to increase the propylene yield and also to sustain for a longer period.

U.S. Pat. No. 7,517,827 discloses a process for preparing a catalyst composition for cracking heavy hydrocarbon which employs a high silica low soda medium pore zeolite. In accordance with process provided in U.S. Pat. No. 7,517,827, the clay slurry is treated with a phosphate source independently and zeolite slurry is treated with ammonical solution. The combination of treated zeolite, the alumina binder, and the phosphate-clay slurry is spray dried and calcined. The precursor slurry pH of 1-3 prior to spray drying improves the attrition resistance.

FCC catalyst/additives with mere high selectivity and high conversion rate are very much desirable but these attributes in themselves are not sufficient to make the overall cracking process efficient and economical. Though it has been possible to attain high propylene yield using the additives hitherto reported, sustaining it over a period of time still remains a challenge.

Cao et al. (U.S. Pat. No. 6,080,303) discloses a process which comprises the steps of treating a zeolite with a phosphorus compound to form a phosphorus treated zeolite and combining the phosphorus treated zeolite with $AlPO_4$. The catalyst composition as taught in Cao et al comprises 0.5 to 10 wt % phosphorous, 1-50 wt % $AlPO_4$, 5-60 wt % zeolite and a binder material.

Kowalski et al. (U.S. Pat. No. 5,318,696) discloses a catalytic cracking process which employs a catalyst composition comprising a large-pore molecular sieve material having pore openings greater than about 7 Angstroms and an additive catalyst composition comprising crystalline material having the structure of ZSM-5 and a silica/alumina mole ratio of less than about 30. The additive catalyst is prepared by a) synthesizing ZSM-5 crystals, b) slurring ZSM-5 with matrix material such as silica, alumina, silica-alumina or clay and if desired phosphorus to make ZSM-5/matrix composition at a pH of 4-6 and spray drying, c) converting the dried ZSM-5 matrix composition to protonic form by acid treatment (e.g., 0.1 to 1 N HCl)/ammonia exchange and/or calcination. The method essentially necessitates the method step of washing for removing sodium sulphate and soda of the ZSM-5 zeolite which are used for preparing a silica-alumina binder.

Demmel et al. (U.S. Pat. No. 5,958,818) discloses a process for preparation of clay/phosphate/zeolite catalyst using clay phosphate as binder by age-reaction of clay phosphate/clay-zeolite-phosphate up to 24 hrs in the pH range of 7 to 14. The proportion of clay in the catalyst prepared by the method provided in U.S. Pat. No. 5,958,818 between 50 to 94.5 wt % with respect to It is well known that it would be difficult to bind zeolite with only clay phosphate system to obtain desired attrition properties even for a low zeolite content (<20%) for FCC formulations. Further, the said patent claims that optimization of beta with total zeolite content of 12 wt % in the above formulation, has shown an improvement in gasoline octane and propylene yield. Though, the hydrothermal deactivations were carried out at 760° C. for 5 hrs, which are mild conditions to predict the stability of additives in commercial FCC plant.

The currently available commercial ZSM-5 additives, having 25-50 wt % zeolite crystals, do not sustain propylene yield in the commercial plant due to continuous deactivation of ZSM-5 and hence, there is a need for a process to provide hydrothermally stable FCC catalyst additive with attrition resistance. The present invention addresses the issue of sustainable propylene yield even after severe hydrothermal deativations for durations more than 100 hours.

In the present invention, the phosphates are effectively used to stabilize the zeolite by ageing and also to minimize clay-phosphate interaction during preparation and further discloses the synergic effect of silica/silica-alumina (binders) with zeolite-phosphate stabilization led to high stability and desired attrition properties.

Definitions

As used in the present specification, the following words and phrases are generally intended to have the meanings as set forth below, except to the extent that the context in which they are used indicate otherwise.

Phosphorous stabilization means effective interactions of ZSM-5 zeolite and phosphate to minimize/prevent the dealumination of zeolite during hydrothermal deactivations under FCC conditions.

Normal hydrothermal deactivation conditions correspond to deactivation at 800° C. with 100% steam for ≤20 hrs.

Severe hydrothermal deactivation conditions correspond to deactivation at 800° C. with 100% steam for ≥20 hrs.

Objects of the Present Invention

An object of the present invention is to provide a process for preparation of ZSM-5 additive for maximization of lower olefin yields ($C_2$-$C_4$ hydrocarbons) primarily propylene yield in FCC.

Another object of the present invention is to provide a process for preparation of a FCC catalyst additive that is capable of sustaining propylene yield for a time period of at least 100 hours.

Yet another object of the present invention is to provide a process for preparation of a FCC catalyst additive which is substantially devoid of sodium.

Still another object of the present invention is to provide a steaming protocol for ZSM-5 additive deactivation for close prediction of plant yields.

SUMMARY

In accordance with the present invention there is provided a zeolite based hydrothermally resistant FCC catalyst additive which consists of a product obtained by spray drying and calcination of a raw material mixture comprising:
zeolite 40 wt % to 60 wt %
phosphate 7 wt % to 12 wt %
clay 20 wt % to 40 wt % and
a binder wt % 10 to 40 wt %;
said binder comprising silica in an amount of 75 to 100 wt % and alumina in an amount of 0 to 25 wt % with respect to the mass of the binder, said additive being characterized by a pre-hydrothermal acidity of 200-350 μmol/g, preferably 200 to 300 μmol/g and a post-hydrothermal acidity of 25 to 150 μmol/g; silica content of above 70%, preferably above 73% with respect to the total mass of the additive, and sodium content less than about 0.5 wt %, preferably below 0.3 wt % with respect to the mass of the additive.

In accordance with one embodiment of the invention colloidal silica is used as the binder.

Typically, the proportion of alumina in the binder is in the range of 0-10 wt %.

Typically, the alumina is at least one selected from the group consisting of pseudo boehmite, gamma-alumina, and alpha-alumina.

Typically, the Zeolite is at least one selected from the group consisting of 8, 10, 12 membered zeolites, micro and mesoporous ZSM-5, mordenite, USY, beta and mixtures thereof.

In accordance with one of the embodiments of the invention, the zeolite used is ZSM-5.

Typically, the silica to alumina ratio (SAR) of the zeolite used is in the range of 23-30.

Typically, the external surface area of ZSM-5 is in the range of 75 to 200 $m^2/g$.

Typically, the hydrothermally resistant FCC catalyst additive of the present invention is capable of limiting the reduction in propylene yield after severe hydrothermal deactivation to lower than 10% within a period of about 20 hours 100 hrs from the commencement of cracking.

Alternatively, the hydrothermally resistant FCC catalyst additive of the present invention is capable of checking/controlling the reduction in propylene yield after severe hydrothermal deactivation to lower than lower than 7% within a period of about 20 hours 100 hrs from the commencement of cracking.

Typically, the hydrothermally resistant FCC catalyst additive of the present invention is capable of providing propylene yield ranging between 15-17 wt % after severe hydrothermal deactivation.

Typically, the hydrothermally resistant FCC catalyst additive of the present invention is capable of providing LPG yield ranging between 37-38.6 wt % after severe hydrothermal deactivation.

Typically, the hydrothermally resistant FCC catalyst additive of the present invention is capable of providing $C_2$-$C_4$ olefin yield in the range of 16.5 to 17.2 wt % after severe hydrothermal deactivation.

In another aspect, the present invention also provides a FCC catalyst that comprises an alumino-silicate and the additive as described herein above.

In according with the present invention, there is also provided a process for preparation of a zeolite based hydrothermally resistant FCC catalyst additive of claim 1, said process comprising:
preparing a slurry containing zeolite by admixing zeolite with water along with a dispersant under constant stirring and subjecting the resultant admixture to ball-milling;
preparing a clear phosphate solution;
admixing the clear phosphate solution and the slurry containing zeolite under stirring to obtain a zeolite-phosphate slurry;
stabilizing the subjecting zeolite-phosphate slurry to obtain a stabilized zeolite-phosphate slurry;
preparing a slurry containing clay;
preparing a slurry containing a binder and treating it with an acid, admixing the slurry containing clay and the slurry containing binder under constant stirring to obtain a clay-binder slurry;
mixing the zeolite-phosphate slurry with the clay-binder slurry to obtain a zeolite-phosphate-clay-binder slurry having a pH in the range of 5 to 9;
spray-drying the zeolite-phosphate-clay-binder slurry to obtain microspheres and subjecting the microspheres to calcination to obtain an additive catalyst that is substantially free from sodium.

Typically, the zeolite slurry is ball milled with dispersant for 10 minutes to 3 hours and most preferably 0.5 to 1.0 h.

Typically, the phosphorous containing compound is at least one selected from the group consisting of phosphoric acid, diammonium hydrogen phosphate (DAHP) and monoammonium hydrogen phosphate.

Typically, the zeolite-phosphate slurry is stabilized at a temperature of about 10-160° C. and preferably at 15-50° C., for a period ranging from 30 minutes to 24 hours and preferably 1-12 hours.

Typically, the pH of the stabilized Zeolite-phosphate slurry is in the range between 7 to 9.

Typically, the dispersant is selected from the group consisting of sodium hexa meta phosphate, sodium pyrophosphate, poly acrylic acid and their derivatives, and mixtures thereof.

Typically, the additive is hydrothermally deactivated with 100% steam at a temperature in the range of 750° C. to 850° C. for 3 hours to 200 hours and most preferably between 780° C. to 810° C. for 20 to 150 hours.

In another aspect of the present invention there is also provided a process for cracking hydrocarbon feed by employing the hydrothermally resistant catalyst additive of the present invention along with a FCC catalyst. The feeds used for the cracking process in accordance with the process of the present invention include olefin streams selected from the group consisting of naphtha, gasoline, and other heavier in the range of $C_4$-$C_{24}$ hydrocarbons or methanol or dimethyl ether or combination thereof.

DETAILED DESCRIPTION OF THE DRAWINGS

Figure 1:
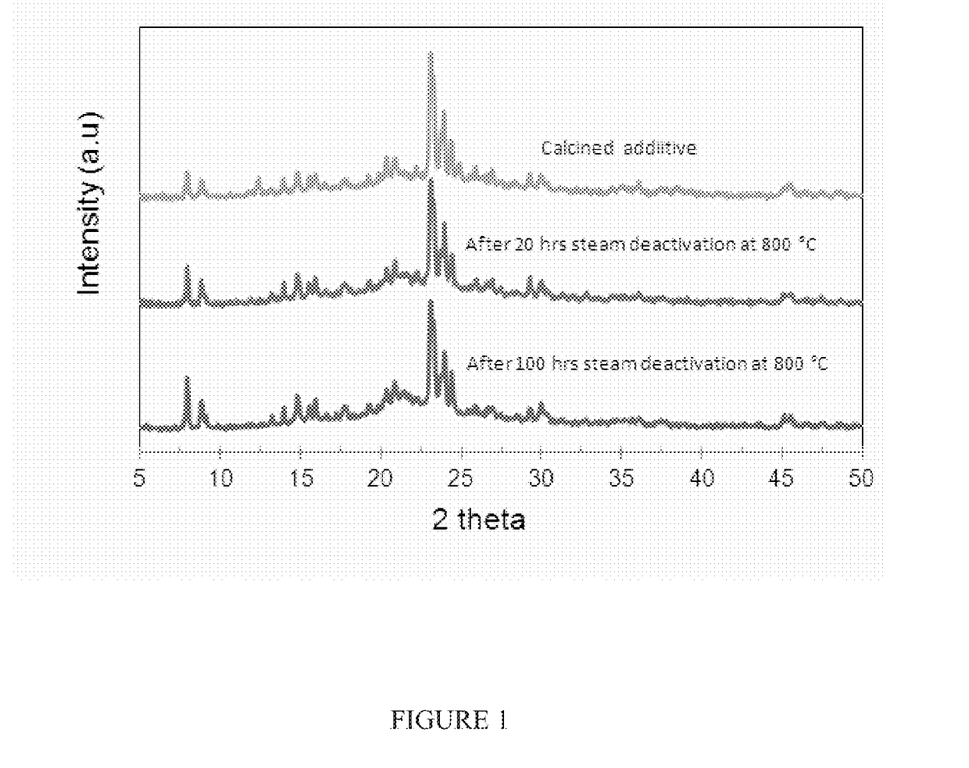
FIG. 1 is a XRD for the calcined additive of the present invention (Example 5) before and after normal and severe hydrothermal de-activation.

FIG. 1: X-ray diffraction patterns were measured to check the hydrothermal stability of the additive prepared in Example 5. It is evident from FIG. 1 that the framework structure of ZSM-5 zeolite in the additive formulations is intact even after severe hydrothermal deactivation of additives of the current invention.

Figure 2:
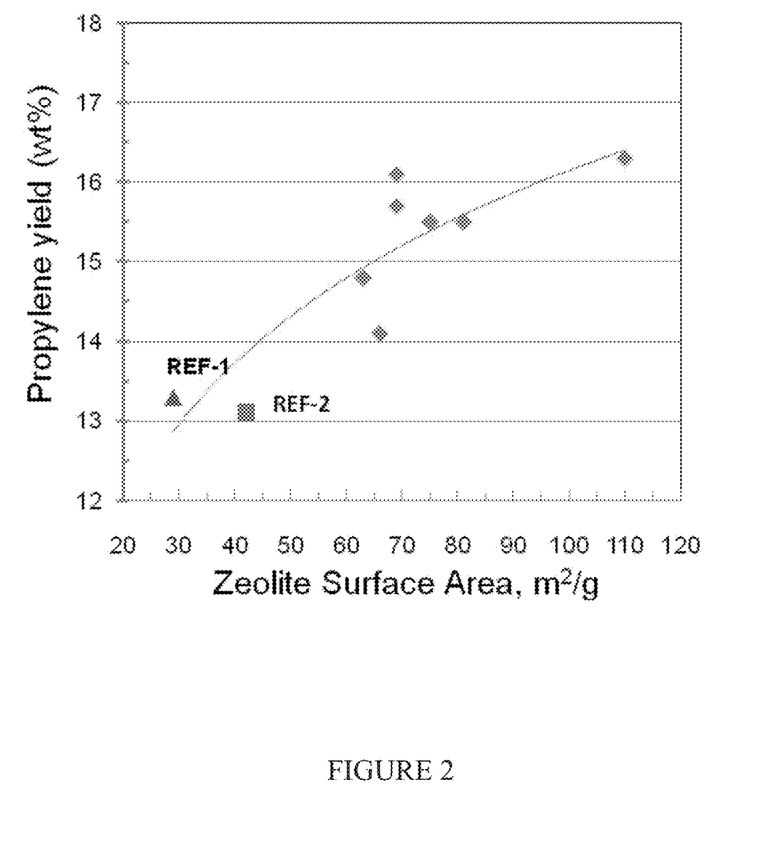
FIG. 2 is a plot that shows the effect of surface area of zeolite on the propylene yield.
Figure 3:
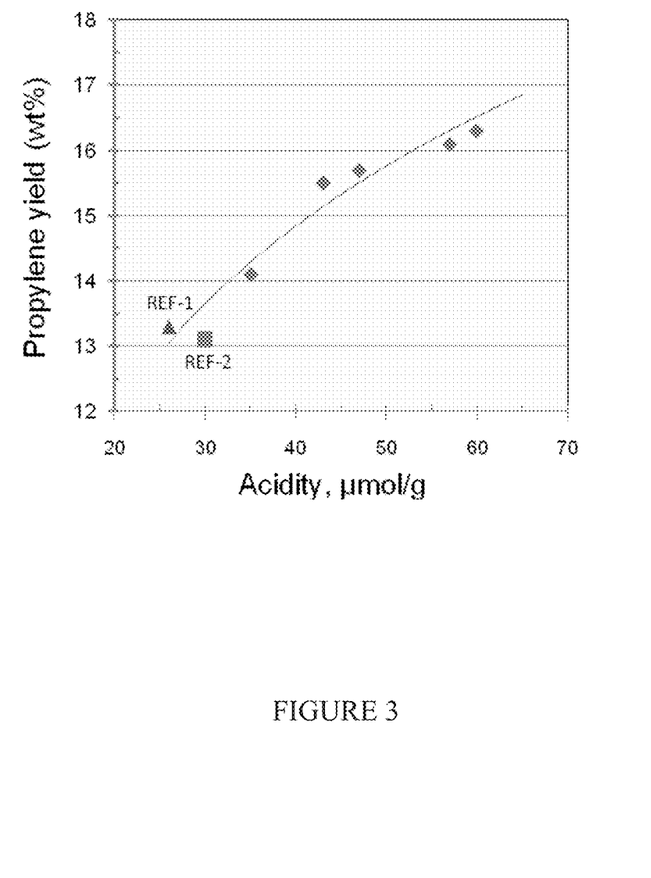
FIG. 3 is a plot that shows the effect of acidity and on the propylene yield.

In FIGS. 2 and 3, the high zeolite surface area (≥65 m$^2$/g) and acidity (≥40 μmol/g) of the present invention after severe hydrothermal deactivations are correlated with propylene yields.

Figure 4:
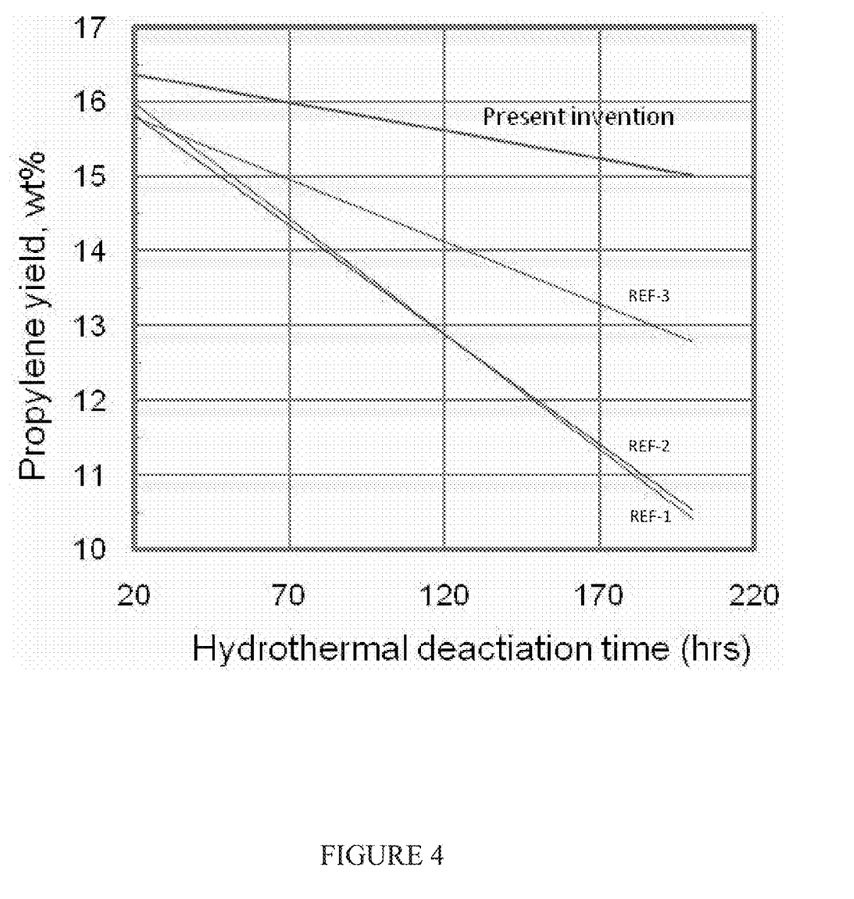
FIG. 4 is a graph that shows the propylene yield plotted against the hydrothermal de-activation time.

FIG. 4 demonstrates the stable ZSM-5 additive of present invention and its superior propylene yields at various steaming time vs. the benchmark prior art additives.

Description

One of the most preferred methods to convert heavy hydrocarbon feed stocks to lighter products, such as gasoline and distillate range fractions is fluid catalytic cracking (FCC). There is, however, an increasing need to enhance the yield of lower olefins, LPG, propylene and other light olefin yields ($C_2$-$C_4$ hydrocarbon) in the product slate from catalytic cracking processes.

The present invention relates to an additive specifically meant to be employed in the process for cracking, a hydrocarbon feed over a particular catalyst composition to produce conversion product hydrocarbon compounds of lower molecular weight than feed hydrocarbons, e.g., product comprising a high propylene fraction and increased LPG.

In accordance with the present invention there is provided a zeolite based hydrothermally resistant FCC catalyst additive which consists of a product obtained by spray drying and calcination of a raw material mixture comprising:

zeolite 40 wt % to 60 wt %
phosphate 7 wt % to 12 wt %
clay 20 wt % to 40 wt % and
a binder wt % 10 to 40 wt %;
said binder comprising silica in an amount of 75 to 100 wt % and alumina in an amount of 0 to 25 wt % with respect to the mass of the binder, said additive being characterized by a pre-hydrothermal acidity of 200-350 μmol/g, preferably 200 to 300 μmol/g and a post-hydrothermal acidity of 25 to 150 μmol/g; silica content of above 70%, preferably above 73% with respect to the total mass of the additive, and sodium content less than about 0.5 wt %, preferably below 0.3 wt % with respect to the mass of the additive.

The total pre and post hydrothermal deactivation acidity of the catalyst is measured by ammonia desorption method as known in the art. The stable micro pore area and acidity (by ammonia desorption) of steam deactivated additive of the present invention correlates well with activity and propylene yields.

In another aspect, the present invention also provides a FCC catalyst that comprises an alumino-silicate and the additive of the present invention as described herein above.

In still another aspect of the present invention there is provided a process for preparation of a zeolite based FCC catalyst additive that selectively improves the yield of propylene. A process of the present invention is also aimed at providing a FCC additive catalyst that is capable of providing and sustaining a high propylene yield for a time period of at least 200 hours, more preferably 100 hours during the cracking process.

The process for preparation of a zeolite based FCC catalyst additive in accordance with the present invention comprises preparing a phosphorous stabilized zeolite containing slurry, preparing a clay containing slurry, preparing a binder containing slurry and adjusting its pH by treating it with an acid; admixing said slurries to obtain a zeolite-clay-binder slurry, spray drying the zeolite-clay-binder slurry to obtain microspheres particles and subjecting the microsphere particles to calcination to obtain a zeolite based FCC catalyst additive with a high hydrothermal resistance.

As used herein, the expression zeolite is meant to refer to 8, 10, or 12 membered zeolites, micro and mesoporous ZSM-5, mordenite and any mixtures thereof. Typically, the 10 member zeolites include ZSM-5, ZSM-11, ZSM-23 and ZSM-35, the 12 member zeolites include beta, USY.

The silica to alumina ratio of the zeolite employed in accordance of the present invention is in the range of 20 to 40, preferably in the range of 23-30 is employed for preparation of the additive. The external surface area of the ZSM employed in the process of the present invention typically ranges between 75 to 200 m$^2$/g.

In accordance with one of the embodiments of the present invention, ZSM 5 is used for preparation of the additive of the present invention.

In accordance with the process of the present invention, a zeolite containing slurry is prepared by admixing zeolite along with a dispersant in water under constant stirring and subjecting the resultant admixture to ball-milling for 10 minutes to 3 hours and most preferably 0.5 to 1.0 h. The dispersants employed in the process of the present invention are typically selected from the group that includes sodium hexa meta phosphate, sodium pyrophosphate, poly acrylic acid and commercial dispersants such as Emulsogen LA 083, Dispersogen PCE DEG 1008183, Dispersogen C of Clariant, Germany, and/or mixtures thereof with less than 0.05 wt % to the zeolite.

The proportion of zeolite in the additive of the present invention is in the range of 20-70 wt %, a preferred range being from 30-60%.

A clear phosphate solution is prepared by dissolving a phosphorus containing compound in water under stirring. The phosphorous containing compound employed in the process of the present invention is at least one selected from the group consisting of phosphoric acid, diammonium hydrogen phosphate (DAHP) and monoammonium hydrogen phosphate.

Typically, the phosphorous content measured in terms of $P_2O_5$ of the additive catalyst of the present invention is in the range of 1 to 20 wt % and most preferably 7-12 wt %.

The process of the present invention is unique and distinct from the hitherto reported methods which involve concurrent treatment of clay and zeolite with phosphorous without stabilization. In accordance with the present invention, zeolite alone is specifically stabilized with phosphorous thereby obviating the interaction between clay and phosphorous during stabilization.

The zeolite-phosphate slurry is prepared by admixing the zeolite-containing slurry and the clear phosphate solution under stirring for a period of about 1 to 5 hours, preferably for a period of about 3 hours at a temperature between 25 to 80° C. Typically, the pH of the zeolite-phosphate slurry at this point of time during the process ranges between 7 to 9.

Method have been taught in the prior art wherein zeolite is treated with phosphorous sources at acidic pH of about 2-4.

However, the disadvantage of such processes is that such treatment causes destruction/leaching of aluminum atom from zeolite which leads to inferior cracking performance due to decrease in acidity and also surface area.

In accordance with the process of the present invention, the zeolite-phosphate slurry is subjected to stabilization for a period of about stabilized at a temperature of about 10-160° C. and preferably at 15-50° C., for a period ranging from 30 minutes to 24 hours and preferably 1-12 hours. The pH of the phosphorous stabilized zeolite-phosphate slurry typically ranges between 7 and 9.

The method step of phosphorous stabilization of zeolite in the process of the present invention is different from the hitherto reported processes for treating zeolite with phosphorous in the prior art in several aspects. Firstly, most of the prior art methods teach the treatment of zeolite with phosphorous at an acidic pH conditions. Processes which involve the treatment of phosphorous at alkaline pH have also been reported. However, they invariably involve the concurrent treatment of zeolite and clay with the phosphorous (e.g., U.S. Pat. No. 5,95,818). In accordance with the process of the present invention, the interaction between the clay and phosphorous is specifically minimized.

Still furthermore, in accordance with the prior art method as reported in U.S. Pat. No. 5,110,776, the zeolite slurry is mixed with the phosphate slurry and the resulting zeolite-phosphate slurry at acidic pH is then subjected to ball milling.

In accordance with the process of the present invention, the zeolite slurry is ball-milled even before it is treated with the phosphorous containing solution. This ensures ease in processing and better stabilization with phosphate. It also avoids the typical processing problems associated the build up of high viscosity and undue temperature increase during processing.

The matrix forming agents, i.e clay and binder with substantially low or zero sodium content are employed in the process of the present invention. Clay employed in the present invention is specifically devoid of sodium containing compounds. Typically, kaolin is used for preparing clay slurry. The clay particle size is below 2 microns (for 90%) and soda content is less than 0.3 wt % and the quartz content of the clay is less than 1%. The proportion of clay in the additive is in the range of 10-40%, a preferred range being from 15-35%. The clay containing slurry is prepared by admixing clay and water under stirring.

The binder used in the process of the present invention comprises colloidal silica having mean diameter ranging from 4 nm to about 90 nm, which is substantially free from sodium. The surface area of the colloidal particles is extremely large and it provides unique intimacy properties which contribute the overall attrition resistance of the additive. Typically, pH of the colloidal silica ranges between 7 and 11.

Usage of silica rich binder in the additive formulation at higher pH results in excellent hydrothermal stability as well as attrition properties. In accordance with one embodiment of the present invention, the binder does not contain any alumina. The additive with a zeolite content of above 40%, prepared by employing the silica rich binders in accordance with the process of the present invention, offer a hydrothermal resistance that is hitherto unreported while maintaining a very high attrition resistance.

The use of sodium free silica and sodium free clay as matrix forming agents in accordance with the process of the present invention obviate the need for a separate method stop of washing the additives. This minimizes additional process step and time and thus contributes to the economy of the overall process. It has also been known in the art that the presence of sodium poisons the catalyst thereby adversely affecting its catalytic activity. Thus, the minimal sodium content also ensures a better catalytic activity.

Alternatively, the binder comprises a combination of colloidal silica and alumina. Typically, the alumina is at least one selected from the group consisting of pseudo boehmite, gamma-alumina and alpha-alumina.

Typically, the silica content of the additive catalyst is above 73% wt %. The binder containing slurry is typically prepared by admixing a binder under stirring and adjusting the pH of the resultant slurry by treating it with an acid. Typically, the acid is selected from the group consisting of nitric acid, acetic acid and formic acid. Preferably, formic acid is used for adjusting the pH of the binder containing slurry to the range of about 1 to about 4.

The slurries containing the matrix forming agents, namely clay and the binder are admixed together and the zeolite-phosphate slurry is introduced in the combined slurry of the matrix forming agents to obtain a zeolite-phosphate-clay-binder slurry with a pH ranging between 5 to 9. Before spray drying, the zeolite-clay-phosphate slurry is maintained at a temperature below 20° C. to avoid any chemical reaction viz polymerization of silica. The zeolite-phosphate-clay-binder is spray dried to obtain microspheres with a size ranging 20 to 180 microns, preferably between 40 to 130 microns. The microspheres are finally calcined at a temperature of about 500° C. for 0.5 hr to 3 hr to about to obtain the additive of the present invention.

Typically, the additive is hydrothermally deactivated with 100% steam at a temperature in the range of 750° C. to 850° C. for 3 hours to 200 hours and most preferably between 780° C. to 810° C. for 20 to 150 hours.

In accordance with another aspect of the present invention there is provided a steaming protocol for deactivating at severe hydrothermal deactivation conditions i.e., High temperature (≥800° C.), long duration (20-200 h) with 60-100% steam to simulate commercial plant yields closely. Normal hydrothermal deactivation conditions correspond to 800° C. with 100% steam for ≤20 hrs and severe hydrothermal deactivation conditions correspond to 800° C. with 100% steam for ≥20 hrs.

A hydrothermally resistant FCC catalyst additive of the present invention is capable of limiting the reduction in propylene yield after severe hydrothermal deactivation to lower than 10% within a period of about 20 hours 100 hrs from the commencement of cracking.

Alternatively, a hydrothermally resistant FCC catalyst additive of the present invention is capable of limiting the reduction in propylene yield after severe hydrothermal deactivation to lower than lower than 7% within a period of about 20 hours 100 hrs from the commencement of cracking.

A hydrothermally resistant FCC catalyst additive of the present invention is capable of providing propylene yield ranging between 15-17 wt % after severe hydrothermal deactivation.

A hydrothermally resistant FCC catalyst additive of the present invention is capable of providing LPG yield ranging between 37-38.6 wt % after severe hydrothermal deactivation.

A hydrothermally resistant FCC catalyst additive of the present invention is capable of providing $C_2$-$C_4$ olefin yield in the range of 16.5 to 17.2 wt % after severe hydrothermal deactivation.

In still another aspect of the present invention there is also provided a process for cracking hydrocarbon feed by employing the hydrothermally resistant catalyst additive of the present invention along with a FCC catalyst. The feeds used for the cracking process in accordance with the process of the present invention include olefin streams selected from the group consisting of naphtha, gasoline, and other heavier in the range of $C_4$-$C_{24}$ hydrocarbons or methanol or dimethyl ether or combination thereof.

The invention will now be described with the help of following non-limiting examples. The performances of these materials were evaluated in stationary fluidized bed Advanced Cracking Evaluation (ACE) Micro reactor unit. The hydro treated vacuum gas oil was injected in the fluidized bed for 30 seconds to generate the cracking data at various catalysts to oil ratios. The product yields at 77% conversions are compiled in this present invention.

In other embodiments, the said additive showed propylene yield in the range of 15 to 16% after severe steam deactivations in comparison with the reference sample (benchmark additive) having 13.3% propylene yield.

EXAMPLE 1

Effect of Alumina in ZSM-5 Additive Formulations as Per Present Invention

Add-1 and Add-2 were prepared with 0% alumina and 4% alumina in the additive formulations. The following illustrates the process for preparation of the same.

888.9 g of ZSM-5 zeolite (loss on ignition 10 wt %) having silica to alumina molar ratio of 30 was made into a slurry with 888.9 g of DM water along with the 0.5 wt % dispersant and ball milled for about 30 minutes. 313.3 g of di ammonium hydrogen phosphate dissolved in 450 g of DM water and mixed with ZSM-5 zeolite slurry. Zeolite-phosphate slurry is stabilized at room temperature under continuous stirring for about 3 hrs. 105.3 g of Pural SB grade alumina (having loss of ignition of 24 wt %) was made into a slurry with 300 g of demineralized (DM) water and peptized with 11 g of formic acid. 776.5 g of kaolin clay (having loss on ignition 15 wt %) was made into a slurry with 466 g of DM water and kept under vigorous stirring. 1000 g of Colloidal silica (having loss on ignition of 70%) was acidified using formic acid. Thus, prepared alumina gel, clay slurry, colloidal silica and zeolite-phosphate slurry were mixed under vigorous stirring for about 1 hour. The final slurry is spray dried to get microsphere particle having Average Particle Size (APS) of 70-110 microns. Spray dried product was calcined at 500° C. for 1 hr and the measured ABD and attrition index (ASTM D5757).

Physico-chemical properties of additive are shown in Table-1. REF-1 and 2 (commercial ZSM-5 additives) are compared with the above additives.

TABLE 1

Physico-chemical properties of additives

| Additive properties | Add-1 (0 wt % added Alumina) | Add-2 (4 wt % added Alumina) | REF-1 | REF-2 |
|---|---|---|---|---|
| TSA (F), $m^2/g$ | 114 | 142 | 127 | 112 |
| ZSA (F), $m^2/g$ | 71 | 90 | — | — |
| MSA (F), $m^2/g$ | 43 | 52 | — | — |
| ABD, g/cc | 0.74 | 0.71 | — | — |
| Attrition Index | 4.9 | 8.3 | 9.6 | 7.6 |
| APS (μ) | 90 | 100 | 101 | 111 |

TABLE 1-continued

Physico-chemical properties of additives

| Additive properties | Add-1 (0 wt % added Alumina) | Add-2 (4 wt % added Alumina) | REF-1 | REF-2 |
|---|---|---|---|---|
| SA and acidity of steamed samples (20 hrs) | | | | |
| TSA (S), $m^2/g$ | 159 | 176 | 124 | 150 |
| ZSA (S), $m^2/g$ | 91 | 87 | — | — |
| MSA (S), $m^2/g$ | 68 | 89 | — | — |
| Acidity* (μmol/g) | 53 | 56 | — | — |

*Acidity measured by ammonia TPD method

The conventional FCC catalyst and present invention additives are hydro thermally deactivated separately at 800° C. for 20 hours using 100% steam at atmospheric pressure. Admixture of hydrothermally deactivated FCC catalyst and additive with predetermined ratio (75:25) was loaded in fixed fluid bed ACE micro reactor. The microreactor is electrically heated to maintain the catalyst bed temperature at 545° C. The hydrotreated Vacuum Gas Oil (VGO) was injected in the fluidized bed for 30 seconds to generate the cracking data at various catalysts to oil ratios. The properties of VGO are shown in Table 2. The product yields at 77% conversion are shown in Table 3. It may be noted that Attrition index (ASTM D5757) below 10 is acceptable for FCC plant applications. Generally AI of more than 10 generates more fines and results in Power Recovery Turbine (PRT) vibrations and also loss of the fines in the stack emission.

TABLE 2

The feed properties of the VGO

| Properties | |
|---|---|
| VGO specific gravity | 0.907 |
| Viscosity (at 99° C.) | 6.8 cSt |
| Sulfur | 0.25 wt % |
| CCR (Carbon) | 0.12 wt % |
| Total Nitrogen | 800 wt ppm |
| UOP K | 11.85 |
| Distillation (SIM Dist D2887) in ° C. | |
| 5 wt % | 327 |
| 10 wt % | 350 |
| 30 wt % | 401 |
| 50 wt % | 433 |
| 70 wt % | 470 |
| 90 wt % | 518 |

TABLE 3

Product yields of additives at 77% conversion after normal hydrothermal deactivations

| Catalyst + Additive, yields wt % | Add-1 (0 wt % added Alumina) | Add-2 (4 wt % added Alumina) | REF-1 | REF-2 |
|---|---|---|---|---|
| Coke | 3.0 | 2.6 | 2.5 | 3.9 |
| Fuel gas | 3.3 | 3.1 | 2.9 | 3.5 |
| Propylene | 16.2 | 16.3 | 14.5 | 16.1 |
| Gasoline | 31.8 | 32.6 | 35.2 | 30.9 |

TABLE 3-continued

Product yields of additives at 77% conversion after normal hydrothermal deactivations

| Catalyst + Additive, yields wt % | Add-1 (0 wt % added Alumina) | Add-2 (4 wt % added Alumina) | REF-1 | REF-2 |
|---|---|---|---|---|
| LCO | 15.2 | 15.8 | 16.3 | 16.2 |
| CSO | 7.8 | 7.2 | 7.0 | 6.8 |
| Total LPG | 38.9 | 38.7 | 36.1 | 38.7 |

The above example demonstrates the stable ZSM-5 additive can be prepared with or without alumina having required attrition resistance properties. Alumina binder provides matrix surface area which improves bottoms up gradation marginally.

EXAMPLE 2

Effect of Silica/Alumina Ratio (SAR) of Zeolite in ZSM-5 Additive Formulations

This example illustrates the process for the preparation of ZSM-5 additive and the effect of ZSM-5 zeolite having different properties such as silica/alumina ratios (SAR=23-30) and varying matrix surface area. The ZSM-5 zeolites SAR 30 (larger Matrix area), SAR-30 (moderate matrix area) and SAR-23 containing additives are named as Add-3, Add-4 and Add-5 respectively. REF-1 and 2 (commercial ZSM-5 additives) are compared with the above additives.

888.9 g of different ZSM-5 zeolites as per Table 4, was made into a slurry with 888.9 g of DM water along with dispersant, which is then milled to a fine paste to produce a zeolite slurry. 313.3 g of di ammonium hydrogen phosphate dissolved in 600 g of DM water and mixed with ZSM-5 zeolite slurry under stirring. 25 g of Pural SB alumina (having loss of ignition of 24 wt %) was made into a slurry with 125 g of demineralized (DM) water and peptized with 4 g of formic acid. 894 g of kaolin clay (having loss on ignition 15 wt %) was made into a slurry with 594 g of DM water and kept under vigorous stirring. 666.7 g of colloidal silica (having loss on ignition of 15%) was acidified using formic acid. Earlier prepared alumina gel, zeolite-phosphate slurry, clay slurry and colloidal silica were mixed for about 1 hour under vigorous stirring.

The final slurry is spray dried to get microsphere particle of APS of about 100 microns. Spray dried product was calcined at 500° C. for 1 hr and the measured ABD and attrition index (ASTM D5757). Physico-chemical properties of zeolites and additive were analyzed as mentioned in Table-4 and 5 respectively. The conventional FCC catalyst and present invention additives are hydro thermally deactivated separately at normal and severe conditions. The product yields at 77 wt % conversion are shown in Table 6.

TABLE 4

Physico-chemical properties of ZSM-5 zeolites

| Zeolite physico-chemical properties | Zeolite-1 | Zeolite-2 | Zeolite-3 |
|---|---|---|---|
| $SiO_2/Al_2O_3$ ratio | 30 | 30 | 23 |
| $Na_2O$ | 0.05 | 0.05 | 0.05 |
| MSA(F), $m^2/g$ | 142 | 127 | 112 |

TABLE 5

Physico-chemical properties of additives: Effect of different zeolite properties.

| Additive properties | Add-3 | Add-3* | Add-4 | Add-5 | Add-5* | REF-1 | REF-2 |
|---|---|---|---|---|---|---|---|
| Zeolite | Z-1 | Z-1 | Z-2 | Z-3 | Z-3 | — | — |
| TSA(F), m2/g | 134 | 134 | 117 | 116 | 116 | 127 | 112 |
| ZSA(F), $m^2/g$ | 87 | 87 | 79 | 80 | 80 | | |
| MSA(F), $m^2/g$ | 47 | 47 | 38 | 36 | 36 | | |
| ABD, g/cc | 0.70 | 0.70 | 0.71 | 0.74 | 0.74 | | |
| Attrition Index | 7.0 | 7.0 | 6.5 | 7.2 | 7.2 | 9.6 | 7.6 |
| APS (μ) | 88 | 88 | 98 | 87 | 87 | 101 | 111 |
| Acidity (μmol/g) | 279 | 279 | 245 | 343 | 343 | — | — |
| SA and acidity of steamed samples | | | | | | | |
| TSA(S), $m^2/g$ | 165 | 163 | 167 | 145 | 136 | 124 | 150 |
| ZSA(S), $m^2/g$ | 87 | 69 | 85 | 83 | 52 | 48 | 49 |
| MSA(S), $m^2/g$ | 78 | 94 | 82 | 62 | 84 | 76 | 101 |
| Acidity (μmol/g) | 116 | 47 | 79 | 73 | 32 | — | — |

*severe hydrothermally deactivated; rest for normal hydrothermal deactivations

TABLE 6

Product yields of additives at 77% conversion

| | Catalyst + additive, yields wt % | | | | | | |
|---|---|---|---|---|---|---|---|
| | Add-3 | Add-3* | Add-4 | Add-5 | Add-5* | REF-2 | REF-2* |
| Coke | 3.6 | 3.8 | 2.8 | 3.4 | 4.4 | 3.9 | 4.0 |
| Dry gas | 3.3 | 3.6 | 4.6 | 3.6 | 2.9 | 3.5 | 2.1 |
| Propylene | 16.8 | 15.7 | 16.6 | 16.7 | 15.0 | 16.1 | 13.1 |
| Gasoline | 29.8 | 32 | 30.2 | 31.0 | 32.6 | 30.9 | 37.5 |
| LCO | 16.2 | 15.8 | 15.5 | 16.2 | 16.5 | 16.2 | 16 |
| CSO | 6.8 | 7.2 | 7.6 | 6.8 | 6.5 | 6.8 | 7.1 |
| Total LPG | 40.3 | 37.6 | 39.3 | 39 | 37.1 | 38.7 | 33.3 |

*severe hydrothermally deactivated; rest for normal hydrothermal deactivations

As can be seen in Table 6, additives of present invention shows high cracking activity and propylene yields are in the range of 16.6 to 16.8 wt %. The deactivation is faster for the low SAR (23) zeolite containing additive (Add-5) due to high alumina content. However, Add-3 (SAR of 30) has showed sustainable propylene yield of about 15.7 even after severe hydrothermal deactivation. Further, the reduction in propylene yield is only 6.5% for the present invention against 18.6% for the conventional commercial additive after severe hydrothermal deactivation is compared to normal deactivations.

EXAMPLE 3

Effect of Ageing Temperature on the Stabilization of Zeolite-Phosphate Slurry in ZSM-5 Additive Formulations This example illustrates the process for the preparation of ZSM-5 additives having stabilized zeolite-phosphate slurry separately at various temperatures from RT to 160° C. in an autoclave for the duration of about 12 hrs. The additives prepared by stabilizing zeolites at autogenous temperatures 80° C., 120° C. and 160° C. for 12 hours, are shown as Add-6, Add-7, and Add-8 respectively. Add-1 and REF (benchmark ZSM-5 additive) is compared with the above additives.

888.9 g of ZSM-5 zeolite having silica to alumina molar ratio of 30 was made into a slurry with 888.9 g of DM water and milled to a fine paste to produce a zeolite slurry. The Zeolite is well dispersed using dispersant. 313.3 g of di ammonium hydrogen phosphate dissolved in 450 g of DM water and mixed with ZSM-5 zeolite slurry under stirring. This zeolite-phosphate slurry is transferred into a Teflon vessel and stabilized in an Autoclave at RT, 80° C., 120° C. and 160° C. for about 12 hours separately.

25 g of Pural SB grade alumina was made into slurry with 125 g of DM water and peptized with 4 g of formic acid. 776.5 g of kaolin clay (having loss on ignition 15 wt %) was made into a slurry with 466 g of DM water and kept under vigorous stirring. 1000 g of Colloidal silica was acidified using formic acid. Earlier prepared alumina gel, zeolite-phosphate slurry, clay-phosphate slurry and colloidal silica were mixed under vigorous stirring. The final slurry was spray dried to get microsphere particle of APS about 100 microns. Spray dried product was calcined at 500° C. for 1 hr. The hydrothermal deactivations and performance evaluations are carried out as per example 1.

TABLE 7

Physico-chemical properties of additives:
Effect of zeolite stabilization temperature

| Additive properties | Add-1 | Add-6 | Add-7 | Add-8 | REF-1 | REF-2 |
|---|---|---|---|---|---|---|
| Ageing (12 h) temperature (° C.) | RT | 80 | 120 | 160 | — | — |
| TSA(F), m²/g | 114 | 121 | 118 | 115 | 127 | 112 |
| ZSA(F), m²/g | 71 | 78 | 73 | 70 | | |
| MSA(F), m²/g | 43 | 43 | 45 | 45 | | |
| ABD, g/cc | 0.74 | 0.75 | 0.71 | 0.71 | — | — |
| Attrition Index | 4.9 | 8.9 | 9.8 | 19.4 | 9.6 | 7.6 |
| APS (μ) | 90 | 105 | 101 | 104 | 101 | 111 |
| SA and acidity of steamed samples after normal hydrothermal deactivation | | | | | | |
| TSA(S), m²/g | 172 | 166 | 162 | 155 | 124 | 150 |
| ZSA(S), m²/g | 87 | 85 | 82 | 80 | 48 | 49 |
| MSA(S), m²/g | 85 | 81 | 80 | 75 | 76 | 101 |
| Acidity (μmol/g) | 53 | 70 | 58 | 53 | — | — |

Physico-chemical properties and performance of additives are shown in Table 7 and 8 respectively. As evident from Table 7 & 8, zeolite-phosphate slurry stabilized at various temperatures of the present invention is hydrothermally highly stable and active in VGO cracking to high propylene yield. The zeolite-phosphate stabilized up to 80° C. temperatures show better attrition index and higher propylene yields.

TABLE 8

Product yields of additives at 77% conversion

| | Catalyst + Additive, yields wt % | | | | | |
|---|---|---|---|---|---|---|
| | Add-1 | Add-6 | Add-7 | Add-8 | REF-1 | REF-2 |
| Zeolite-phosphate Stabilization temperature (° C.) | RT | 80 | 120 | 160 | — | — |
| Coke | 3.0 | 3.4 | 3.6 | 3.4 | 2.5 | 3.9 |
| Dry gas | 3.3 | 4.4 | 3.1 | 3.2 | 2.9 | 3.5 |
| Propylene | 16.2 | 16.3 | 15.5 | 15.6 | 14.5 | 16.1 |
| Gasoline | 31.8 | 30.3 | 32.7 | 32.8 | 35.2 | 30.9 |
| LCO | 15.2 | 15.5 | 15.4 | 15.6 | 16.3 | 16.2 |
| CSO | 7.8 | 7.5 | 7.5 | 7.5 | 7.0 | 6.8 |
| Total LPG | 38.9 | 38.9 | 37.7 | 37.5 | 36.1 | 38.7 |

EXAMPLE 4

Effect of Zeolite Contents (40-55 Wt %) in ZSM-5 Additive Formulations

This example illustrates the process for the preparation of ZSM-5 additives having stabilized zeolite-phosphorous slurry with ZSM-5 (SAR 30) content ranging from 40 to 55 wt %. Further, ultrasonic effect study on zeolite-phosphate slurry also illustrated here. The additives composition details (Add-1, Add-9 to Add-12) are shown in Table 9.

888.9 g of ZSM-5 zeolite (SAR 30) was made into slurry with 888.9 g of DM water and milled to a fine paste to produce zeolite slurry. The zeolite is well dispersed using dispersant. 313.3 g of di ammonium hydrogen phosphate dissolved in 450 g of DM water and mixed with ZSM-5 zeolite slurry under stirring. This zeolite-phosphate slurry is stabilized for 3 hours. 25 g of Pural SB grade alumina was made into slurry with 125 g of DM water and peptized with 4 g of formic acid. 776.5 g of kaolin clay (having loss on ignition 15 wt %) was made into a slurry with 466 g of DM water and kept under vigorous stirring. 1000 g of colloidal silica was acidified using formic acid.

TABLE 9

Additive compositions of the present invention

| Additive composition | Add-1 | Add-9 | Add-10 | Add-11 | Add-12 |
|---|---|---|---|---|---|
| ZSM-5 (wt %) | 40 | 45 | 50 | 55 | 55 |
| Phosphate and Matrix (wt %) | Rest | Rest | Rest | Rest | Rest |
| Remarks | — | — | — | — | Ultrasonic treatment |

Earlier prepared alumina gel, zeolite-phosphate slurry, clay-phosphate slurry and colloidal silica were mixed under vigorous stirring. The final slurry was spray dried to get microsphere particle of APS about 100 microns. Spray dried product was calcined at 500° C. for 1 hr. The zeolite-phosphate slurry of Add-12 is further stabilized under ultrasonic irradiation for about 30 minutes. Physico-chemical properties of additives were analyzed as mentioned in Table 10. The hydrothermal deactivation and performance evaluations carried out as per example 1.

TABLE 10

Physico-chemical properties of additives having various zeolite contents of the present invention

| Properties of additives | Add-1 | Add-9 | Add-10 | Add-11 | Add-12 | REF-1 | REF-2 |
|---|---|---|---|---|---|---|---|
| ZSM-5 (wt %) | 40 | 45 | 50 | 55 | 55 | — | — |
| TSA(F), m$^2$/g | 114 | 132 | 156 | 173 | 172 | 127 | 112 |
| ZSA(F), m$^2$/g | 71 | 81 | 101 | 113 | 112 | — | — |
| MSA(F), m$^2$/g | 43 | 51 | 55 | 60 | 60 | — | — |
| ABD, g/cc | 0.74 | 0.74 | 0.75 | 0.74 | 0.74 | — | — |
| Attrition Index | 4.9 | 7.0 | 9.8 | 8.2 | 8.0 | 9.6 | 7.6 |
| APS (μ) | 90 | 93 | 104 | 123 | 126 | 101 | 111 |
| SA and acidity of steamed samples after normal hydrothermal deactivation | | | | | | | |
| TSA(S), m$^2$/g | 172 | 182 | 200 | 192 | 208 | 124 | 150 |
| ZSA(S), m$^2$/g | 87 | 93 | 104 | 104 | 114 | — | — |
| MSA(S), m$^2$/g | 85 | 89 | 96 | 88 | 94 | — | — |
| Acidity (μmol/g) | 53 | 60 | 43 | 40 | 43 | — | — |

TABLE 11

Product yields at 77% conversion for different zeolite content of additives

| | Catalyst + Additive, yields wt % | | | | | | |
|---|---|---|---|---|---|---|---|
| | Add-1 | Add-9 | Add-10 | Add-11 | Add-12 | REF-1 | REF-2 |
| Coke | 3.0 | 4.3 | 3.8 | 3.8 | 3.7 | 2.5 | 3.9 |
| Dry gas | 3.3 | 4.4 | 2.4 | 2.6 | 2.7 | 2.9 | 3.5 |
| Propylene | 16.2 | 16.4 | 14.5 | 14.7 | 15.3 | 14.5 | 16.1 |
| Gasoline | 31.8 | 28.4 | 36.3 | 35 | 34.2 | 35.2 | 30.9 |
| LCO | 15.2 | 16.4 | 15.7 | 16.2 | 16.2 | 16.3 | 16.2 |
| CSO | 7.8 | 6.5 | 7.3 | 6.8 | 6.8 | 7.0 | 6.8 |
| Total LPG | 38.9 | 40 | 34.5 | 35.6 | 36.4 | 36.1 | 38.7 |

As it is evident from the Table 11, Add-9 has been found to have better propylene yield. Further, ultrasonic irradiation found to provide better zeolite-phosphate stabilization and higher propylene yield particularly for higher zeolite content. The performance data of Add-11 and Add-12, demonstrates the need of ultrasonic treatment for better dispersion of zeolite in high zeolite content additives and their stabilization.

EXAMPLE 5

Effect of Dispersants in ZSM-5 Additive Formulations

This example illustrates the process for the preparation of ZSM-5 additives having stabilized zeolite-phosphorous slurry with and without sodium free dispersant.

888.9 g of ZSM-5 zeolite was made into slurry with 888.9 g of DM water and milled to a fine paste to produce zeolite slurry. 313.3 g of di ammonium hydrogen phosphate dissolved in 450 g of DM water and mixed with ZSM-5 zeolite slurry under stirring. This zeolite-phosphate slurry is stabilized for 3-6 hours. 25 g of Pural SB grade alumina was made into slurry with 125 g of DM water and peptized with 4 g of formic acid. 776.5 g of kaolin clay was made into slurry with 466 g of DM water and kept under vigorous stirring. 1000 g of Colloidal silica was acidified using formic acid. Zeolite and clay slurries are separately well dispersed using dispersants like SHMP, Emulsogen LA 083 and mixtures.

Earlier prepared alumina gel, zeolite-phosphate slurry, clay-phosphate slurry and colloidal silica were mixed under vigorous stirring. The final slurry was spray dried to get microsphere particle of APS about 100 microns. Spray dried product was calcined at 500° C. for 1 hr. Zeolite and clay slurries are separately well dispersed using dispersants like sodium hexa meta phosphate, Emulsogen LA 083 (Eg) and mixtures. The additives composition details are shown in Table 12. Physico-chemical properties of additives were analyzed as mentioned in Table 13. The hydrothermal deactivation and performance evaluations carried out as per example 1. ZSM-5 crystals containing benchmark ZSM-5 additives are referred as REF-1 and REF-2 and these are also steam deactivated under normal and severe conditions.

TABLE 12

Typical Composition of ZSM-5 additive formulations of present invention of dispersant effect

| Additive composition | Add-1 | Add-13 | Add-14 |
|---|---|---|---|
| Dispersant | SHMP | Eg | SHMP + Eg |
| ZSM-5 (wt %) | 40 | 40 | 40 |
| P$_2$O$_5$ and matrix (%) | Rest | Rest | Rest |

TABLE 13

Physico-chemical properties of additives having various zeolite contents of the present invention

| Additive properties | Add-1 | Add-13 | Add-14 | REF-1 | REF-2 |
|---|---|---|---|---|---|
| TSA(F), m$^2$/g | 114 | 112 | 121 | 127 | 112 |
| ZSA(F), m$^2$/g | 71 | 73 | 79 | — | — |
| MSA(F), m$^2$/g | 43 | 39 | 42 | — | — |
| ABD, g/cc | 0.74 | 0.70 | 0.70 | — | — |
| Attrition Index | 4.9 | 7.0 | 3.34 | 9.6 | 7.6 |
| APS (μ) | 90 | 100 | 124 | 101 | 111 |
| SA and acidity of steamed samples after severe hydrothermal deactivation | | | | | |
| TSA(S), m$^2$/g | 168 | 161 | 166 | 124 | 150 |
| ZSA(S), m$^2$/g | 81 | 69 | 75 | 48 | 49 |
| MSA(S), m$^2$/g | 87 | 92 | 91 | 76 | 101 |
| Acidity (μmol/g) | 43 | 57 | 43 | — | — |

TABLE 14

Product yields at 77% conversions on additives by the use of different dispersants.

| | Catalyst + additive, yields wt % | | | | | |
|---|---|---|---|---|---|---|
| | After normal hydrothermal deactivations | | After severe hydrothermal deactivations | | | |
| | Add-1 | REF-2 | Add-1 | Add-13 | Add-14 | REF-2 |
| Coke | 3.0 | 3.9 | 3.8 | 3.9 | 4.5 | 4.0 |
| Dry gas | 3.3 | 3.5 | 3.0 | 4.4 | 3.5 | 2.1 |
| Propylene | 16.2 | 16.1 | 15.5 | 16.1 | 15.5 | 13.1 |
| Gasoline | 31.8 | 30.9 | 33.1 | 30.1 | 31.7 | 37.5 |
| LCO | 15.2 | 16.2 | 16 | 14.9 | 16.1 | 16 |
| CSO | 7.8 | 6.8 | 7.1 | 8.1 | 6.9 | 7.1 |
| Total LPG | 38.9 | 38.7 | 37 | 38.6 | 37.3 | 33.3 |

As it is evident from Table 14, sodium free dispersant found to be beneficial for propylene yields. Further, the present invention demonstrates the excellent hydrothermal stability of additive which enables to sustain the propylene yield even after severe hydrothermal deactivations. The reduction in propylene yield was only about 5% for the additive prepared as per the current invention. On the other hand the bench mark additive has shown a sharp drop in propylene and LPG yields after severe hydrothermal deactivation vis-a-vis after normal steaming conditions.

The numerical values given for various physical parameters, dimensions and quantities are only approximate values and it is envisaged that the values higher than the numerical value assigned to the physical parameters, dimensions and quantities fall within the scope of the invention and the claims unless there is a statement in the specification to the contrary.

While considerable emphasis has been placed herein on the specific features of the preferred embodiment, it will be appreciated that many additional features can be added and that many changes can be made in the preferred embodiment without departing from the principles of the invention. These and other changes in the preferred embodiment of the invention will be apparent to those skilled in the art from the disclosure herein, whereby it is to be distinctly understood that the foregoing descriptive matter is to be interpreted merely as illustrative of the invention and not as a limitation.

We claim:

1. A zeolite based hydrothermally resistant Fluid Catalytic Cracking (FCC) catalyst additive which comprises a product obtained by spray drying and calcination of a raw material mixture having a pH ranging from 5 to 9 comprising:
    ZSM-5 zeolite ranging from 40 wt % to 60 wt % that has been stabilizing with
    at least one phosphate source selected from the group consisting of diammonium hydrogen phosphate (DAHP) and monoammonium hydrogen phosphate, wherein the phosphate is measured in terms of $P_2O_5$ and ranges from 7 wt % to 12 wt % to provide a stabilized zeolite-phosphate slurry having a pH in the range of 7-9;
    clay ranging from 20 wt % to 40 wt %; and
    a binder ranging from 10 wt % to 40 wt %;
    said binder comprising silica in an amount of 75 to 100 wt % with respect to the mass of the binder, said additive being characterized by a pre-hydrothermal acidity of 200-350 μmol/g and a post-hydrothermal acidity of 25 to 150 μmol/g; silica content of above 70 % with respect to the total mass of the additive, and sodium content less than 0.5 wt % with respect to the mass of the additive.

2. A hydrothermally resistant FCC catalyst additive as claimed in claim 1, wherein the binder is colloidal silica.

3. A hydrothermally resistant FCC catalyst additive as claimed in claim 1, wherein the binder further comprises alumina in an amount of 0.001-10 wt %.

4. A hydrothermally resistant FCC catalyst additive as claimed in claim 3, wherein the alumina is at least one selected from the group consisting of pseudo boehmite, gamma-alumina, and alpha-alumina.

5. A hydrothermally resistant FCC catalyst additive as claimed in claim 1, wherein the silica to alumina ratio (SAR) of the zeolite used is in the range of 23-30.

6. A hydrothermally resistant FCC catalyst additive as claimed in claim 1, wherein the external surface area of the ZSM-5 zeolite is in the range of 75 to 200 $m^2/g$.

7. A FCC catalyst composition comprising a large pore zeolite and the additive as claimed in claim 1.

8. A process for preparation of a zeolite based hydrothermally resistant FCC catalyst additive of claim 1, said process comprising:
    preparing a slurry containing zeolite by admixing zeolite with water along with a dispersant under constant stirring and subjecting the resultant admixture to ball-milling;
    preparing a clear phosphate solution;
    admixing the clear phosphate solution and the slurry containing zeolite under stirring to obtain a zeolite-phosphate slurry;
    stabilizing the subjecting zeolite-phosphate slurry to obtain a stabilized zeolite-phosphate slurry having a pH in the range of 7 to 9;
    preparing a slurry containing clay;
    preparing a slurry containing a binder and treating it with an acid,
    admixing the slurry containing clay and the slurry containing binder under constant stirring to obtain a clay-binder slurry;
    mixing the zeolite-phosphate slurry with the clay-binder slurry to obtain a zeolite-phosphate-clay-binder slurry having a pH in the range of 5 to 9;
    spray-drying the zeolite-phosphate-clay-binder slurry to obtain microspheres and subjecting the microspheres to calcination to obtain an additive catalyst that is substantially free from sodium.

9. A process as claimed in claim 8, wherein the zeolite slurry is ball milled with dispersant for 10 minutes to 3 hours and most preferably 0.5 to 1.0 h.

10. A process as claimed in claim 8, wherein the phosphorous containing compound is at least one selected from the group consisting of phosphoric acid, diammonium hydrogen phosphate (DAHP) and monoammonium hydrogen phosphate.

11. A process as claimed in claim 8, wherein the pH of the stabilized zeolite-phosphate slurry is 7 to 9.

12. A process as claimed in claim 8, wherein the zeolite-phosphate slurry is stabilized at a temperature of about 10-160° C. and preferably at 15-50° C., for a period ranging from 30 minutes to 24 hours and preferably 1-12 hours.

13. A process as claimed in claim 8, wherein, the dispersant is selected from the group consisting of sodium hexa meta phosphate, sodium pyrophosphate, poly acrylic acid and their derivatives, and mixtures thereof.

14. A process as claimed in claim 8, wherein the additive is hydrothermally deactivated with 100 % steam at a temperature in the range of 750° C. to 850° C. for 3 hours to 200 hours and most preferably between 780° C. to 810° C. for 20 to 150 hours.

15. A process for cracking hydrocarbon feed by employing the hydrothermally resistant catalyst additive as claimed in claim 1 along with a FCC catalyst; wherein the feed includes olefin streams selected from the group consisting of naphtha, gasoline, other heavier in the range of $C_4$-$C_{24}$ hydrocarbons or methanol or dimethyl ether or combination thereof.

* * * * *